United States Patent [19]
Morris et al.

[11] Patent Number: 5,993,516
[45] Date of Patent: Nov. 30, 1999

[54] ADSORBENTS FOR SEPARATING NITROGEN FROM A FEED GAS

[75] Inventors: Michael Morris, West Midlands; Stuart Charles Frank Robinson, Barrow upon Soar; David Frederick Lander, Tamworth, all of United Kingdom

[73] Assignee: BG plc, Berkshire, United Kingdom

[21] Appl. No.: 09/043,926

[22] PCT Filed: Dec. 21, 1995

[86] PCT No.: PCT/GB95/03004

§ 371 Date: Apr. 10, 1998

§ 102(e) Date: Apr. 10, 1998

[87] PCT Pub. No.: WO96/20785

PCT Pub. Date: Jul. 11, 1996

[30] Foreign Application Priority Data

Jan. 5, 1995 [GB] United Kingdom .................. 9500176

[51] Int. Cl.$^6$ ................................. B01D 53/047
[52] U.S. Cl. ................. 95/96; 95/130; 95/902; 96/108; 502/60
[58] Field of Search ................ 95/96–106, 130, 95/902; 96/108

[56] References Cited

U.S. PATENT DOCUMENTS

| | | | |
|---|---|---|---|
| 4,935,580 | 6/1990 | Chao et al. | 585/820 |
| 4,964,888 | 10/1990 | Miller | 95/130 X |
| 4,964,889 | 10/1990 | Chao | 95/902 X |
| 5,587,003 | 12/1996 | Bülow et al. | 95/902 X |
| 5,616,170 | 4/1997 | Ojo et al. | 95/130 X |

FOREIGN PATENT DOCUMENTS

| | | | |
|---|---|---|---|
| 60-215509 | 10/1985 | Japan | 95/130 |
| 62-132727 | 6/1987 | Japan . | |
| 63-162519 | 7/1988 | Japan . | |
| 1754181 | 8/1992 | U.S.S.R. | 95/130 |

OTHER PUBLICATIONS

M.W. Ackley et al., "Clinoptilolite: Untapped potential for Kinetic gas separations", *Zeolites,* 1992, vol. 12, Sep./Oct., pp. 780–788.

M.W. Ackley et al., "Adsorption Characteristics of High–Exchange Clinoptilolites", *Ind. Eng. Chem. Res.,* vol. 30, No. 12, 1991, pp. 2523–2530.

*Primary Examiner*—Robert Spitzer
*Attorney, Agent, or Firm*—Oblon, Spivak, McClelland, Maier & Neustadt, P.C.

[57] ABSTRACT

An adsorbent for separating nitrogen from a feed gas containing at least one other gas having molecular dimensions equal to or larger than methane, the adsorbent comprising clinoptilolite having a sodium ion content of at least 17 equivalent percent of the total ion exchangeable cations and optionally one or more non-univalent cations, which if present comprise in total less than 12 equivalent percent of the total ion exchangeable cations, the balance, if any, being one or more non-sodium univalent cations.

11 Claims, No Drawings

ADSORBENTS FOR SEPARATING NITROGEN FROM A FEED GAS

This invention is concerned with clinoptilolite adsorbents suitable for the separation of nitrogen from mixtures of gases of larger molecular dimensions, particularly methane, but also ethylene, ethane, propylene, butane, butene, etc. These adsorbents are designed for use in cyclic adsorption processes such as pressure swing (psa) and thermal swing (tsa) adsorption separation (see for example, D M Ruthven, ADSORPTION AND ADSORPTION PROCESSES, Academic Press, 1984, and R T Yang, GAS SEPARATION BY ADSORPTION PROCESSES, Butterworths, 1987).

Within the natural gas industry, it has been recognised that the reduction of nitrogen levels in natural gas (whether that nitrogen is present initially, or introduced by injection into a depleted well) represents a significant technical challenge. The current favoured solution to this challenge, by cryogenic separation, suffers from high capital and running costs. Separation by cyclic adsorption offers a potentially cheaper solution.

The chief problem hindering the development of a process for natural gas denitrogenation by cyclic adsorption lies in the lack of an adsorbent suitably selective for nitrogen over methane. Conventional cyclic adsorption processes such as for example the production of oxygen-enriched air (see D W Breck, ZEOLITE MOLECULAR SIEVES, John Wiley and Sons, 1974) rely on adsorbents with an energetic, or equilibrium, selectivity for one or more components of the gaseous mixture to be separated. Common microporous adsorbents for separation processes, such as microporous carbons and zeolites, possess equilibrium selectivities for methane (a principal component of natural gases) over nitrogen. Although these afford a potential means of natural gas denitrogenation, energy costs associated with the repressurisation of adsorbed methane would be economically prohibitive.

An alternative means of achieving selectivity in adsorbents is to attempt to differentiate molecules on the grounds of their molecular dimensions. Nitrogen is smaller than methane in terms of both its kinetic diameter, and in its critical van der Waals' dimension (see D W Breck, ZEOLITE MOLECULAR SIEVES, John Wiley and Sons, 1974, p636). What is required, therefore, is an adsorbent with a pore size such that it adsorbs the smaller nitrogen molecule at a much faster rate than the larger methane. Such a material would possess a kinetic selectivity for nitrogen adsorption over methane, and be suitable for use in natural gas denitrogenation by psa.

T C Frankiewicz and R G Donelly (Chapter 11, INDUSTRIAL GAS SEPARATIONS, American Chemical Society, 1983) disclosed that both mineral clinoptilolite (a naturally occurring and abundant zeolite), and clinoptilolite directly exchanged with calcium ions, display a kinetic selectivity for nitrogen over methane. This selectivity was used on a pilot plant scale to demonstrate that nitrogen separation from methane by psa was technically feasible if an appropriate, short, cycle time was employed. If too long a cycle time was used, however, more methane than nitrogen was adsorbed on the clinoptilolite. This demonstrated that the zeolite possessed only rate selectivity for nitrogen, having an equilibrium selectivity for the hydrocarbon component.

K Igawa et al. (ADSORPTIVE SEPARATING AGENT, Japanese Patent 62-132,542) disclosed that calcium exchanged clinoptilolites with $CaO/Al_2O_3$ ratios of 0.40 to 0.75 were useful for separating molecules with kinetic diameters of less than 3.70 Å from mixtures with molecules of greater dimensions. Separation of nitrogen from methane on these grounds was demonstrated.

C C Chao (SELECTIVE ADSORPTION OF NITROGEN ON MAGNESIUM-CONTAINING CLINOPTILOLITES, European Published Patent Application No. 437,027) disclosed further that clinoptilolites containing at least five percent of their exchangeable cations (as defined within the above patent) as magnesium ions were suitable for the separation of molecules of dimensions equal to or smaller than nitrogen from those larger than nitrogen. Disclosed also in this patent were the proportions of other cations, which—in combination with at least five percent of exchangeable magnesium ions—yielded suitable adsorbents for the aforementioned separation.

The previous disclosures on clinoptilolite discussed above have dealt chiefly with the production of adsorbents with rate selectivities for nitrogen over methane. In the cyclic separation of nitrogen from natural gas by psa, however, consideration must also be given to regeneration methods for the adsorbent. In a psa cycle, the gaseous mixture to be separated is passed through a bed of selective adsorbent at high pressure. The nitrogen is preferentially adsorbed by the bed, leaving a product depleted in that component. After adsorption for a certain length of time, the gas flow to the adsorbent bed is terminated, and adsorbed nitrogen on the bed removed by reduction of pressure. This regenerates the adsorbent's capacity for further nitrogen removal. The efficiency of this regeneration is dependent on both the scale of the reduction in bed pressure and on the strength of interaction between adsorbent and adsorbate. For strongly-bound adsorbates, an extremely high vacuum may be required for the regeneration of the adsorbent's full capacity. Information on both the strength of adsorbent-adsorbate interactions and on the magnitude of the pressure swing required for regeneration is given by the equilibrium adsorption isotherm of the system under examination.

In conventional psa processes using equilibrium selective adsorbents (for example, air separation), a small fraction of the product gas is often used to help regeneration by flushing the more strongly adsorbed gas from the adsorbent bed, in addition to reduction of pressure. When using nitrogen rate selective adsorbents for natural gas denitrogenation, however, this option is not available as the methane molecule is more strongly adsorbed than nitrogen itself. Regeneration in this case is thus only possible by pressure reduction. The energy costs associated with vacuum regeneration are significant and may even be prohibitive if an absolute pressure of less than, for example, 0.1 bar is employed. Consequently full adsorbent regeneration may not be cost-effective, forcing an increase in both size of bed and adsorbent inventory.

Clinoptilolites, as prepared in the previous disclosures, although showing the desired kinetic selectivity to nitrogen, have been found to have steep nitrogen isotherms at low pressures. A high level of regeneration is therefore not possible with these materials, unless high levels of vacuum are applied.

The present invention discloses methods for the preparation of clinoptilolites with rate selectivities for nitrogen over methane and with improved regeneration properties. As in previous reports, these are prepared by cation exchange of mineral clinoptilolite. We have discovered, however, that divalent exchangeable cations such as magnesium and calcium can be minimised within the clinoptilolite to improve regeneration in a psa process, while still maintaining or improving the rate selectivity for nitrogen of the mineral. Rate selectivity in these materials is effected by controlling the relative amounts of univalent cations within the clinoptilolite.

According therefore to one aspect of the present invention we provide an adsorbent for separating nitrogen from a feed gas containing at least one other gas having molecular dimensions equal to or larger than methane, the adsorbent comprising clinoptilolite having a sodium ion content of at least 17 equivalent percent of the total ion exchangeable cations and optionally one or more non-univalent cations, which if present comprise in total less than 12 equivalent percent of the total ion-exchangeable cations, the balance, if any, being one or more non-sodium univalent cations.

According to a second aspect of the present invention we provide a process for producing an adsorbent for separating nitrogen from a feed gas containing at least one other gas having molecular dimensions equal to or larger than methane, the process comprising subjecting a clinoptilolite to at least one ion exchange with a solution containing a univalent cation to produce a clinoptilolite having a sodium ion content of at least 17 equivalent percent of the total ion exchangeable cations and optionally one or more non-univalent cations which if present comprise in total less than 12 equivalent percent of the total ion exchangeable cations, the balance, if any, being one or more non-sodium univalent cations.

According to a third aspect of the present invention, we provide a process for separating nitrogen from a feed gas containing at least one other gas having molecular dimensions equal to or larger than methane, the process comprising contacting the feed gas with a clinoptilolite adsorbent to provide a product gas with a lower proportion of nitrogen relative to the other gas or gases than in the feed gas, the adsorbent having a sodium ion content of at least 17 equivalent percent of the total ion exchangeable cations and optionally one or more non-univalent cations, which if present comprise in total less than 12 equivalent percent of the total non-ion exchangeable cations, the balance, if any, being made up by one or more non-sodium univalent cations.

Preferably the sodium ion content lies within the range 17 to 95 equivalent percent of the total ion exchangeable cations.

Suitably the sodium ion content lies within the range 26 to 80 equivalent percent of the total ion exchangeable cations.

The non-sodium univalent cation is at least one of the following:—$H^+$, $NH_4^+$, $K^+$, $Rb^+$ and $Ce^+$.

The method we have employed for the modification of the clinoptilolites involves preparation of intermediate materials which contain predominantly only one type of cation (hereafter referred to as homoionic clinoptilolites). Other means of achieving the required cation content of the clinoptilolite, known to those skilled in the art, may be employed, however.

The homoionic clinoptilolites are produced by repeated cation exchange of the mineral clinoptilolite with aqueous solutions of a salt of the cation to be introduced. This salt may be the chloride or any other suitable salt of the metal to be introduced. The homoionic intermediate is then used for the preparation of clinoptilolites containing principally two or more types of cations by further cation exchange (using aqueous salt solutions as previously discussed). Finally, the clinoptilolite is subjected to thermal treatment (activation) to dehydrate the zeolite. This activation is required to make the micropores of the clinoptilolite available for the adsorption of nitrogen or methane. In addition, this activation serves to convert clinoptilolites containing ammonium ions as one of their major exchangeable cations to materials containing hydrogen ions in their stead.

The raw mineral clinoptilolite may be subjected to ion exchange either in the granular or other form supplied commercially, or crushed and as a fine flowing powder. The ion-exchanged clinoptilolite may be used for the psa separation of nitrogen from methane in the form of either the original granules or in other physical forms, such as beads or extrudates, the production of beads or extrudates from fine zeolite powders being known to those skilled in the art of the preparation of molecular sieves. The production of the absorbent may include the addition of other materials, such as clays, silicas, aluminas, metal oxides and mixtures thereof.

In the present disclosure, chemical analysis was carried out using Inductively Coupled Plasma (ICP) Atomic Absorption Spectroscopy for metal cations. Ammonium ion contents were determined using a combination of direct nitrogen analysis and thermogravimetric analysis.

The rates of nitrogen and methane uptakes were examined using a constant volume technique. A measured amount of the sorptive, either nitrogen or methane, was dosed into a vessel of calibrated volume and allowed to expand into a separate vessel containing a known amount of activated clinoptilolite, with constant monitoring of system pressure. The amount of gas adsorbed was calculated as a function of elapsed time by direct measurement of pressure change.

Samples were activated in-situ by heating under vacuum at 500° C. for three hours. Dosing volume was that required to give a final absolute pressure of one bar in the absence of adsorption. In practice, depending upon the extent of adsorption, final absolute pressures were in the range 0.8 to 1.0 bar.

Comparison of nitrogen and methane adsorbed at the same elapsed time allows the calculation of a rate selectivity defined as:

$$R_t = Q_n/Q_m$$

where $R_t$=rate selectivity at time t $Q_n$, $Q_m$=amounts of, respectively, nitrogen and methane adsorbed at time t.

Adsorbents with adequate rate selectivity are considered to be those whose rate selectivity for nitrogen over methane exceeds 5 after 25 seconds. In addition, the most desirable adsorbents are considered to be those which adsorb at least 0.2 mol/kg of nitrogen in this time period.

Nitrogen adsorption isotherms were determined over the absolute pressure range 0–10 bar using an Intelligent Gravimetric Analyser (IGA). This proprietary thermobalance was supplied by Hiden Analytical of Warrington, UK, and allows the automated determination of adsorption equilibria. Desirable adsorbents were considered to be those which have nitrogen working capacities exceeding 1.2 mol/kg as defined by:

$$Q_w = (N_2 \text{ uptake at 10 bar}) - (N_2 \text{ uptake at 0.1 bar})$$

Where $Q_w$ is the working capacity

In cases where there is a significant quantity of cation present as non-clinoptilolite material, correction of the composition is necessary by determining the ion-exchangeable cation content, for example as taught by Chao (see above), or by repeated cation exchange with solutions containing ammonium cations—the method employed here and described below.

The following examples are provided for illustrative purposes only and are not intended to limit the scope of the claims that follow.

EXAMPLE 1

A raw mineral clinoptilolite, termed Laporte clinoptilolite, was obtained from Laporte Industries. After crushing to a fine powder, ammonium ion exchange of this material was then carried out by stirring 75 g of powder with 1.5 litres of aqueous ammonium chloride solution at 90° C. for six hours. The solid was then isolated from suspension, and washed chloride free with deionised water. This procedure was repeated twice to yield a homoionic ammonium clinoptilolite. This was then dried at 110° C. to yield the ammonium form of Laporte clinoptilolite.

Chemical analysis gave the results shown in Table 1a, example 1. The cation contents excluding ammonium—expressed here as ratios of equivalents of charge to total mols of aluminium and iron—are therefore (by our definition) non-exchangeable and form the basis of our calculation of exchangeable cation content for examples 4, 5 and 6 in Table 1b.

EXAMPLE 2

A raw mineral clinoptilolite, termed East West clinoptiloite, was obtained from H&H Minerals (Glasgow, UK). After crushing to a fine powder, ammonium ion exchange of this material was then carried out by stirring 75 g of powder with 1.5 litres of aqueous ammonium chloride solution at 90° C. for six hours. The solid was then isolated from suspension, and washed chloride free with deionised water. This procedure was repeated twice to yield a homoionic ammonium clinoptilolite. This was then dried at 110° C. to yield the ammonium form of East West clinoptilolite.

Chemical analysis gave the results shown in Table 1a, example 2. The cation contents excluding ammonium—expressed here as ratios of equivalents of charge to total mols of aluminium and iron—are therefore (by our definition) non-exchangeable and form the basis of our calculation of exchangeable cation content for example 7 in Table 1b.

EXAMPLE 3

A raw mineral clinoptilolite, termed Adsorbex clinoptilolite, was obtained from Aquip Products (UK). After crushing to a fine powder, ammonium ion exchange of this material was then carried out by stirring 75 g of powder with 1.5 litres of aqueous ammonium chloride solution at 90° C. for six hours. The solid was then isolated from suspension, and washed chloride free with deionised water. This procedure was repeated twice to yield a homoionic ammonium clinoptilolite. This was then dried at 110° C. to yield the ammonium form of Adsorbex clinoptilolite.

Chemical analysis gave the results shown in Table 1a, example 3. The cation contents excluding ammonium—expressed here as ratios of equivalents of charge to total mols of aluminium and iron—are therefore (by our definition) non-exchangeable and form the basis of our calculation of exchangeable cation content for example 8.

EXAMPLE 4

The composition of the powdered raw mineral clinoptilolite described in example 1 is shown in Table 1b, example 4. Exchangeable sodium content of this sample is therefore the total sodium content, less the non-exchangeable sodium content taken from example 1 (Table 1a, example 1) or 0.065–0.033=0.032 equivalents/mol (Al+Fe). Similarly the exchangeable ammonium, potassium, magnesium and calcium cation contents are 0.000, 0.255, 0.165 and 0.427 equivalents/mol (Al+Fe) respectively and the total exchangeable cation content is 0.879 equivalents/mol (Al+Fe). Exchangeable sodium content of this sample is therefore 4 equivalent percent of the total exchangeable cation content. Exchangeable cations of charge greater than one amount to 67 equivalent percent of the total exchangeable cation content.

The rates of both nitrogen and methane adsorption were examined using the constant volume technique described previously. Results are shown in Table 2, example 4. Rate selectivity is 11.8. Equilibrium uptakes of nitrogen—shown in Table 2, example 4—result in a working capacity of 1.00 mol/kg. The raw mineral clinoptilolite thus displays suitable rate selectivity but with poor regeneration properties.

EXAMPLE 5

The powdered raw mineral clinoptilolite described in example 1 was subjected to repeated potassium ion exchange to prepare a highly potassium-exchanged form of the zeolite. The method used was to stir 75 g of the clinoptilolite powder with 1.5 litres of aqueous 1M potassium chloride solution at 90° C. for six hours. After this time, the solid clinoptilolite was washed chloride ion-free with deionised water by decantation. The exchange was then repeated twice as above, before final filtration and drying (at 110° C.) of the potassium clinoptilolite product. Chemical analysis yielded the composition shown in Table 1b, example 5. Exchangeable sodium content of this sample is therefore 0.038 equivalents/mol (Al+Fe) or 4 equivalent percent of the total exchangeable cation content. Exchangeable cations of charge greater than one amount to 16 equivalent percent of the total exchangeable cation content.

Results from the constant volume adsorption technique are shown in Table 2, example 5. Rate selectivity is calculated to be 1.24. Measurements of equilibrium nitrogen uptakes gave the results shown in Table 2, example 5. The working capacity was therefore 1.24 mol/kg. The material thus possessed improved regeneration properties, but with insufficient rate selectivity for separating nitrogen from methane.

EXAMPLE 6

The powdered raw mineral clinoptilolite described in example 1 was subjected to repeated sodium ion exchange to prepare the sodium form of the zeolite. This method involved refluxing 25 g of the raw mineral with 0.5 litres of 0.5M aqueous sodium chloride solution for 6 hours, followed by washing chloride ion-free by decantation with deionised water. In total, the clinoptilolite was treated with 5 fresh sodium chloride solutions, before finally being obtained by centrifugation and dried at 110° C. Chemical analyses are shown in Table 1, example 6. Exchangeable sodium content of this sample is therefore 0.732 equivalents/mol (Al+Fe) or 83 equivalent percent of the total exchangeable cation content. Exchangeable cations of charge greater than one amount to 8 equivalent percent of the total exchangeable cation content.

Results from the constant volume adsorption technique are shown in Table 2, example 6. Rate selectivity is calculated to be 16.9. Measurements of equilibrium nitrogen uptakes gave the results shown in Table 2, example 6. The working capacity was therefore 1.14 mol/kg. This material, therefore, possessed good rate selectivity for nitrogen over methane and improved regeneration properties. Its low nitrogen uptake in 25 seconds, however, prevent it from being a most desirable adsorbent.

EXAMPLE 7

Sodium ions were introduced into the ammonium zeolite described in example 2 by agitating (by rolling in a Techne temperature controlled oven) 2.5 g of solid with 50 millilitres of aqueous 0.5M sodium chloride for 3 hours at 65° C. The solid was then isolated by centrifugation, washed with deionised water until chloride-free, and dried at 110° C. Two further sodium ion exchanges were then carried out by repeating the above method.

Chemical analyses are shown in Table 1, example 7. Exchangeable sodium content of this sample is therefore 0.615 equivalents/mol (Al+Fe) or 70 equivalent percent of the total cation content. No exchangeable cations of charge greater than one were present. The zeolite was then converted to its hydrogen/sodium form by calcination in air at 525° C. for 16 hours.

Results from the constant volume adsorption technique are shown in Table 2, example 7. Rate selectivity is calculated to be 9.3. Measurements of equilibrium nitrogen uptakes gave the results shown in Table 2, example 7. The working capacity was therefore 1.57 mol/kg. The zeolite was, therefore, a most desirable adsorbent in terms of nitrogen uptake after 25 seconds, rate selectivity and improved regeneration.

EXAMPLE 8

The raw mineral clinoptilolite described in example 3 was used in its original granular form, with the only pretreatment being a preliminary wash with deionised water. Potassium ion exchange of this material was achieved by stirring 25 kg of clinoptilolite with 130 litres of aqueous 0.61M potassium nitrate solution at 95° C. for eight hours. The solid was then washed metal cation free, and the above procedure repeated twice to yield an intermediate potassium clinoptilolite. Sodium ion exchange was then carried out using the same procedure with three, separate, 130 litre aqueous solutions of 0.82M sodium nitrate. After washing with deionised water, the solid was isolated and dried at 100° C for 18 hours.

Chemical analyses are shown in Table 1, example 8. Exchangeable sodium content of this sample is therefore 0.458 equivalents/mol (Al+Fe) or 53 equivalent percent of the total exchangeable cation content. Exchangeable cations of charge greater than one amount to 10 equivalent percent of the total cation content.

Results from the constant volume adsorption technique are shown in Table 2, example 8. Rate selectivity is calculated to be 9.3. Measurements of equilibrium nitrogen uptakes gave the results shown in Table 2, example 8. The working capacity was therefore 1.21 mol/kg. The zeolite was, therefore, a most desirable adsorbent in terms of nitrogen uptake after 25 seconds, rate selectivity and improved regeneration.

TABLE 1a

| Example: | 1 | 2 | 3 |
|---|---|---|---|
| | Wt %, dry basis | | |
| $SiO_2$ | 79.479 | 80.185 | 78.838 |
| $Al_2O_3$ | 13.284 | 12.981 | 13.132 |
| MgO | 0.613 | 0.265 | 0.232 |
| $Na_2O$ | 0.283 | 0.243 | 0.674 |
| CaO | 0.154 | 0.126 | 0.336 |
| $K_2O$ | 0.650 | 0.410 | 0.843 |
| $(NH_4)_2O$ | 5.832 | 6.048 | 5.731 |
| $Fe_2O_3$ | 1.101 | 0.801 | 0.944 |
| Total | 101.396 | 101.058 | 100.729 |
| | Cation content, equivalent/(Al + Fe) | | |
| $NH_4^+$ | 0.816 | 0.878 | 0.817 |
| $Na^+$ | 0.033 | 0.030 | 0.081 |
| $K^+$ | 0.050 | 0.033 | 0.066 |
| $Mg^{++}$ | 0.111 | 0.050 | 0.043 |
| $Ca^{++}$ | 0.020 | 0.017 | 0.044 |
| Total | 1.031 | 1.007 | 1.051 |

TABLE 1b

| Example: | 4 | 5 | 6 | 7 | 8 |
|---|---|---|---|---|---|
| | Wt %, dry basis | | | | |
| $SiO_2$ | 74.645 | 67.951 | 72.164 | 80.185 | 76.357 |
| $Al_2O_3$ | 12.660 | 11.772 | 12.150 | 12.981 | 12.244 |
| MgO | 1.492 | 0.647 | 0.928 | 0.265 | 0.332 |
| $Na_2O$ | 0.539 | 0.539 | 5.985 | 5.284 | 4.179 |
| CaO | 3.358 | 0.350 | 0.448 | 0.126 | 0.770 |
| $K_2O$ | 3.855 | 10.335 | 2.686 | 0.410 | 4.577 |
| $(NH_4)_2O$ | 0.000 | 0.000 | 0.000 | 1.819 | 0.000 |
| $Fe_2O_3$ | 1.573 | 1.101 | 1.115 | 0.801 | 0.815 |
| Total | 98.122 | 92.695 | 95.477 | 101.870 | 99.273 |
| | Cation content, equivalent/(Al + Fe) | | | | |
| $NH_4^+$ | 0.000 | 0.000 | 0.000 | 0.264 | 0.000 |
| $Na^+$ | 0.065 | 0.071 | 0.765 | 0.644 | 0.539 |
| $K^+$ | 0.305 | 0.897 | 0.226 | 0.033 | 0.388 |
| $Mg^{++}$ | 0.276 | 0.131 | 0.183 | 0.050 | 0.066 |
| $Ca^{++}$ | 0.447 | 0.051 | 0.063 | 0.017 | 0.110 |
| Total | 1.093 | 1.150 | 1.237 | 1.008 | 1.102 |
| | Exchangeable cation content, equivalent/(Al + Fe) | | | | |
| $NH_4^+$ | 0.000 | 0.000 | 0.000 | 0.264 | 0.000 |
| $Na^+$ | 0.032 | 0.038 | 0.732 | 0.615 | 0.458 |
| $K^+$ | 0.255 | 0.846 | 0.176 | 0.000 | 0.322 |
| $Mg^{++}$ | 0.165 | 0.020 | 0.072 | 0.000 | 0.023 |
| $Ca^{++}$ | 0.427 | 0.031 | 0.043 | 0.000 | 0.065 |
| Total | 0.879 | 0.935 | 1.023 | 0.879 | 0.868 |
| | Exchangeable cation content, equivalent % | | | | |
| $M^{n+}$ | 67 | 5 | 11 | 0 | 10 |
| $M^+$ | 33 | 95 | 89 | 100 | 90 |
| $Na^+$ | 4 | 4 | 72 | 70 | 53 |
| (where n > 1) | | | | | |
| (Calculation based on example No.: | | | | | |
| | 1 | 1 | 1 | 2 | 3 |

TABLE 2

| Example No | 4 | 5 | 6 | 7 | 8 |
|---|---|---|---|---|---|
| | Uptake after 25 seconds, mol/kg | | | | |
| $N_2$ | 0.58 | 0.47 | 0.06 | 0.43 | 0.32 |
| Rate Selectivity | 11.80 | 1.24 | 16.90 | 9.30 | 9.45 |
| | Equilibrium $N_2$ uptake, mol/kg | | | | |
| 1 bar | 0.52 | 0.11 | 0.16 | 0.13 | 0.16 |
| 10 bar | 1.52 | 1.35 | 1.30 | 1.70 | 1.37 |
| Working Capacity | 1.00 | 1.24 | 1.14 | 1.57 | 1.21 |

We claim:

1. A process for separating nitrogen from a feed gas containing at least one other gas having molecular dimensions equal to or larger than methane, the process comprising contacting the feed gas with a clinoptilolite adsorbent to provide a product gas with a lower proportion of nitrogen relative to the other gas or gases than in the feed gas, the adsorbent containing a sodium ion content lying within the range of 17 to 95 equivalent percent of the total ion exchangeable cations and optionally one or more non-univalent cations, which if present comprise in total less than 12 equivalent percent of the total ion exchangeable cations, the balance, if any, being made up of one or more non-sodium univalent cations. and the adsorbent having:

1) a rate selectivity for nitrogen over methane which exceeds 5 after 25 seconds as defined by $R_t = Q_n/Q_m$ where $R_1$ = rate selectivity at time t, and $Q_n$, $Q_m$ = amounts of, respectively nitrogen and methane adsorbed at time t;

2) a capacity to adsorb at least 0.2 mol/kg of nitrogen in 25 seconds; and 3) a nitrogen working capacity exceeding 1.2 mol/kg as defined by $Q_w = (N_2$ uptake at 10 bar$) - (N_2$ uptake at 0.1 bar) where $Q_w$ is the working capacity.

2. A process as claimed 1 in which the sodium ion content lies within the range 26 to 80 equivalent percent of the total ion exchangeable cations.

3. A process as claimed in any of claims 1 in which the non-sodium univalent cation is one or more of the following:—$H^+$, $NH_4^+$, $K^+$, $Li^+$, $Rb^+$ and $Ce^+$.

4. The process of claim 1, further comprising regenerating the clinoptilolite adsorbent by exposing it to reduced pressure.

5. The process of claims 1, in which the sodium ion content lies within the range 26 to 80 equivalent percent of the total ion exchangeable cations.

6. An adsorbent for separating nitrogen from a feed gas containing at least one other gas having molecular dimensions equal to or larger than methane, the adsorbent comprising clinoptilolite having a sodium ion content lying within the range 17 to 95 equivalent percent of the total ion exchangeable cations and optionally one or more non-univalent cations, which if present comprise in total less than 12 equivalent percent of the total ion-exchangeable cations, the balance, if any, being one or more non-sodium univalent cations, and the adsorbent having:

1) a rate selectivity for nitrogen over methane which exceeds 5 after 25 seconds as defined by $R_t = Q_n/Q_m$ where $R_1$ = rate selectivity at time t, and $Q_n$, $Q_m$ = amounts of, respectively nitrogen and methane adsorbed at time t:

2) a capacity to adsorb at least 0.2 mol/kg of nitrogen in 25 seconds: and 3) a nitrogen working capacity exceeding 1.2 mol/kg as defined by $Q_w = (N_2$ uptake at 10 bar$) - (N_2$ uptake at 0.1 bar) where $Q_w$ is the working capacity.

7. An adsorbent as claimed in claim 6 in which the sodium ion content lies within the range 26 to 80 equivalent percent of the total ion exchangeable cations.

8. An adsorbent as claimed in claim 6 in which the non-sodium univalent cation is one or more of the following:—$H^+$, $NH_4^+$, $K^+$, $Li^+$, $Rb^+$ and $Ce^+$.

9. A process for producing an adsorbent for separating nitrogen from a feed gas containing at least one other gas having molecular dimensions equal to or larger than methane, the process comprising subjecting a clinoptilolite to at least one ion exchange with a solution containing a univalent cation to produce a clinoptilolite having a sodium ion content lying within the ranze 17 to 95 equivalent percent of the total ion exchangeable cations and optionally one or more non-univalent cations which if present comprise in total less than 12 equivalent percent of the total ion exchangeable cations, the balance, if any, being one or more non-sodium univalent cations and the adsorbent having:

1) a rate selectivity for nitrogen over methane which exceeds 5 after 25 seconds as defined by $R_t = Q_n/Q_m$ where $R_1$ = rate selectivitv at time t, and $Q_n$, $Q_m$ = amounts of, respectively, nitrogen and methane adsorbed at time t;

2) a capacity to adsorb at least 0.2 mol/kg of nitrogen in 25 seconds: and 3) a nitrogen working capacity exceeding 1.2 mol/kg as defined by $Q_w = (N_2$ uptake at 10 bar$) - (N_2$ uptake at 0.1 bar) where $Q_w$ is the working capacity.

10. A process as claimed in claim 9 in which the sodium ion content of the clinoptilolite lies within the range 26 to 80 equivalent percent of the total ion exchangeable cations.

11. A process as claimed in claim 9 in which the non-sodium univalent cation is one or more of the following:—$H^+$, $NH_4^+$, $K^+$, $Li^+$, $Rb^+$ and $Ce^+$.

* * * * *